128,980

UNITED STATES PATENT OFFICE.

JAMES L. ROWLAND, OF MILWAUKEE, WISCONSIN.

IMPROVEMENT IN HARDENING ARTIFICIAL-STONE WALLS, CONCRETE, &c.

Specification forming part of Letters Patent No. 128,980, dated July 16, 1872.

Specification of JAMES L. ROWLAND, of Milwaukee, Wisconsin, describing a new mode of Hardening Walls, Floors, Pavements, Roofs, and the beds or foundations of these and other articles made or constructed of artificial or manufactured stone, béton, concrete, or mortar, and for hardening mortar or cement in walls and coatings, or enamels when applied to walls, roofs, pavements, or floors, or to the surfaces of artificial or manufactured stone, or to various articles wrought or formed of stone, marble, slate, or other material, and for hardening manufactured or artificial stone and various cements, compositions, or combinations of materials when put into or applied to various forms, purposes, and uses, and intended to become stone or marble or its equivalent.

My invention consists in applying, in any practicable mode or manner, water, steam, or vapors charged or saturated with carbonic gas or carbonic acid dissolved in water, or in water containing various mineral salts in solution—as silicates, carbonates, chlorides, or sulphates—to the surfaces of the walls, or stone or other articles, or coatings or enamels on the same. A very simple and efficient method of making the application is to conduct or transmit to the material, surfaces, or coatings, or enamels on the same intended to be hardened, the water or vapor charged or saturated with the gas or the carbonic acid dissolved in vapor or water or other liquid or solution, through a suitable tube, pipe, or hose, having a rose pierced with fine holes affixed to the end thereof. In this manner water or other liquids charged or saturated with the gas or the carbonic acid in solution with them can be distributed evenly and in regulated quantities over the surfaces of the walls or other articles or material or coatings, and made to fall gently, and, if desired, in the form of fine spray upon them, without injury to the same. And, if deemed desirable, a covering of suitable material may be fitly placed or adjusted to or over the article or coating, after the application, to retard or prevent evaporation of the water or other liquid holding the gas in solution, and, as far as practicable, the escape of the gas. Or the stone or other articles, if of such dimensions as to be easily handled, may be placed in a chamber or apartment suitably constructed, or may first be conveniently arranged, and a suitable covering-chamber or apartment be then placed, constructed, or formed over, or over and around them, and they thus exposed to an atmosphere artificially produced and supplied of carbonic gas, or carbonic acid in combination with steam or vapors, till the stone or other articles are hardened, or in the case of coatings or enamels on the same are hardened.

The chambers or apartments are supplied or charged with carbonic gas, or carbonic acid and steam or vapors, in various ways. An efficient and simple method is to produce the carbonic gas by burning coke, charcoal, or anthracite coal, either separately or two or more together, or one or more, in combination with lime-rock or other carbonated or carbonized substances, in a suitable grate or furnace, with arrangements such as to permit the free escape or transmission of the gas produced, together with steam or vapors if used in combination with it. The quantities of steam or vapor used, and its temperature, together with that of the gas, or the temperature of the chamber or apartment, may be so regulated as to best facilitate the hardening. When this method is used a supply of steam or vapor may be obtained by placing near the burning material a pan or boiler of proper dimensions and keeping it properly supplied with water, the pan or boiler having attached to it a pipe or other suitable arrangement to conduct the steam or vapor into the chamber or apartment—there to mingle with the gas—or to conduct the vapor or steam to the burning material, or to the gas as it is produced therefrom, so that the vapor or steam may mix or mingle with the gas as the latter is produced, or immediately thereafter, and escape or be transmitted with it into the chamber or apartments. Or the vapor and gas, in combination, may be obtained by any suitable arrangement by which properly-regulated quantities of water, in the form of fine spray, are thrown or discharged upon the burning material.

This hardening art or mode acts efficiently upon any composition, mixture, or combination of materials having for its base or combining medium, or as a part or one or more of its ingredients, either quicklime, hydraulic lime, magnesia, or their hydrates, hydraulic cement, or any substance that may unite with carbonic gas, or carbonic acid and water, or other liquid or solution or moisture and form a carbonate. Also, upon quicklime, hydraulic lime, magnesia, or their hydrates, hydraulic cement, and such other substances as may unite with carbonic gas, or carbonic acid and moisture, or water or other liquid or solution, and form carbonates, combined or not, but unmixed with sand or other equivalent material, and has for its object and advantage the securing of speedy and most efficient results, by furnishing the mixtures, compositions, or material intended to be affected or hardened with a more abundant supply of carbonic gas, or carbonic acid gas and moisture, than is supplied by the surrounding atmosphere, and in a manner and under circumstances calculated to facilitate the chemical changes and transformation desired.

What I claim in this invention is—

The hardening of artificial or manufactured stone and other articles and material, also coatings or enamels on walls and other articles, by the application to them, without the use of chambers or apartments—except as the same may be formed with a covering of suitable material after the application—of carbonic gas artificially produced and combined with water, or water having one or more mineral salts in solution, or with steam or vapors or other liquid or solution.

JAS. L. ROWLAND.

Witnesses:
  I. HOLMES,
  SIDNEY SMITH.